United States Patent [19]

Tagg et al.

[11] 4,279,430
[45] Jul. 21, 1981

[54] FIFTH-WHEEL SUSPENSION SYSTEM

[75] Inventors: Forrest L. Tagg, Circle Pines; Francis E. Tourville, Forest Lake, both of Minn.

[73] Assignee: Air-Glide Corporation, Lino Lakes, Minn.

[21] Appl. No.: 59,062

[22] Filed: Jul. 19, 1979

[51] Int. Cl.³ .............................................. B62D 53/08
[52] U.S. Cl. ..................................................... 280/439
[58] Field of Search ................... 280/433, 438 R, 439, 280/440, 405 A, 405 R, 407, 425

[56] References Cited

U.S. PATENT DOCUMENTS

| 2,821,409 | 1/1958 | Chalmers | 280/439 X |
| 3,197,237 | 7/1965 | Smith | 280/405 A |
| 3,380,758 | 4/1968 | Granning | 280/438 R |
| 3,884,503 | 5/1975 | Damm | 280/440 |

FOREIGN PATENT DOCUMENTS 959026  5/1964  United Kingdom ..................... 280/440

Primary Examiner—John A. Pekar
Attorney, Agent, or Firm—LaValle D. Ptak

[57] ABSTRACT

A vibration isolation fifth wheel suspension system comprises a fifth wheel support plate mounted between the spaced parallel frame members of a truck tractor on a pivotal axis located near the forward end of the tractor. The plate is located to rest on the upper surface of the frame members and its free end is mounted on a pressurized air suspension supported by a cross member extending between the tractor frame members. Two pairs of first and second cooperating wear plates are used to minimize lateral shift and roll of the support plate. The first plate of each pair is attached to and depends downwardly from the under surface of the support plate in sliding relationship with the second plates of each pair which are fixed to the cross frame member. In use, the air suspension system is provided with air under pressure to elevate the fifth wheel support plate above the frame, and controls are provided to permit expulsion of the air from the suspension system to lower the support plate to directly overly and be supported by the truck frame members.

15 Claims, 3 Drawing Figures

FIFTH-WHEEL SUSPENSION SYSTEM

BACKGROUND OF THE INVENTION

Fifth wheels of the type used to detachably couple the forward end of a semi-trailer to a tractor generally are attached to rail members rigidly secured to the tractor frame. This results in a rigid interconnection between the tractor frame and the forward end of the trailer. This results in the transmission of substantial shock between the trailer and tractor through the fifth wheel assembly. As a consequence, loads within the trailer, particularly at its forward end, often are subjected to damage when the wheels of the tractor and trailer pass over bumps or pot holes in the road. Also, the tractor itself is subjected to incessant pounding from the trailer through the rigid fifth wheel coupling. Thirdly, the tractor driver is subjected to this pounding or shock throughout the time he is operating the vehicle creating fatigue and often serious physical problems.

To alleviate the problems resulting from the incessant pounding of the tractor by the trailer and vice-versa through the fifth wheel assembly, various proposals have been made in the past. For the protection of the driver, the driver's seat is mounted with resilient suspension between it and the tractor cab. An attempt illustrated in Gouirand U.S. Pat. No. 2,968,496 to isolate the tractor frame from the trailer has been made by mounting the fifth wheel assembly on the tractor through a special suspension system directly supported by the rear axle of the tractor instead of the frame. Such departure from a standard fifth wheel mounting however requires expensive and complex rebuilding or customized construction of the tractor rear axle and has not resulted in any significant acceptance in the industry.

Other proposals have been made for providing a resilient mounting for the fifth wheel mounting plate in the form of a support attached across the top of the tractor frame. Various types of resilient steel springs and pneumatic air bag springs have been proposed for this purpose, but the resultant structure raises the forward end of the trailer to generally unacceptable heights. Even if the suspension system is capable of being lowered to a non-support position (particularly in the case of airbag suspensions), the relatively bulky structure which must be mounted on top of the tractor frame still prevents the lowering of the forward end of the trailer sufficiently for many uses. As a result, the operator of a tractor equipped with such a prior art fifth wheel assembly is given two choices. Either he must restrict his trailer height to a height which is less than he could use with a conventional fifth wheel assembly, or the tractor trailer must be routed, often over relatively long detours, around any overhead obstructions which do not provide sufficient clearance for the elevated trailer. In most cases both of these alternatives are unacceptable. Examples of fifth wheel mounting assemblies of this type are shown in the patents to Masser, U.S. Pat. No. 3,137,515 issued June 16, 1964; Granning, U.S. Pat. No. 3,380,758 issued Apr. 30, 1968; Chalmers, U.S. Pat. No. 2,821,409 issued Jan. 28, 1958; and Granning, U.S. Pat. No. 3,253,840 issued May 31, 1966. For the most part the disadvantages of these systems created because of their relatively complex nature and the additional height which is added to the trailer under all conditions of use, have resulted in minimal acceptance of such assemblies.

It is desirable to provide a fifth wheel mounting assembly which effectively cushions and isolates the tractor and trailer from communicating shock during operation of the tractor trailer and which is of simple construction so that it can be incorporated as original equipment onto a tractor or readily mounted onto an existing tractor with minimum effort. In addition it is desirable to include a resilient mounting for fifth wheel of a tractor trailer combination which does not significantly increase the height of the trailer when the mounting assembly is placed in its lowermost position.

BRIEF SUMMARY OF THE INVENTION

Accordingly, it is an object of this invention to provide an improved fifth wheel suspension structure.

It is another object of this invention to provide an improved resilient fifth wheel suspension system.

It is additional object of this invention to provide an improved pneumatic fifth wheel suspension system for isolating shock between a tractor and a trailer attached to the fifth wheel.

It is a further object of this invention to provide an improved pneumatic fifth wheel suspension system for a tractor which may be mounted on a conventional tractor without significantly raising the height of the the fifth wheel above the height it occupies in a conventional attachment to the tractor.

In accordance with a preferred embodiment of this invention, a fifth wheel suspension system for providing vibration isolation comprises a fifth wheel support plate mounted between the spaced parallel frame members of a truck tractor on a a pivotal axis located near the forward end of the tractor. A resilient suspension is mounted between the other end of the fifth wheel support plate and the frame for normally elevating such end of the support plate a preset distance above the frame. To minimize lateral shift and roll of the support plate, at least one pair of first and second cooperating wear plates are attached respectively to the support plate and the frame. The wear plate attached to the support plate depends downwardly from it and is located in a sliding relationship with the second wear plate attached to the frame.

DETAILED DESCRIPTION

Figure 1:
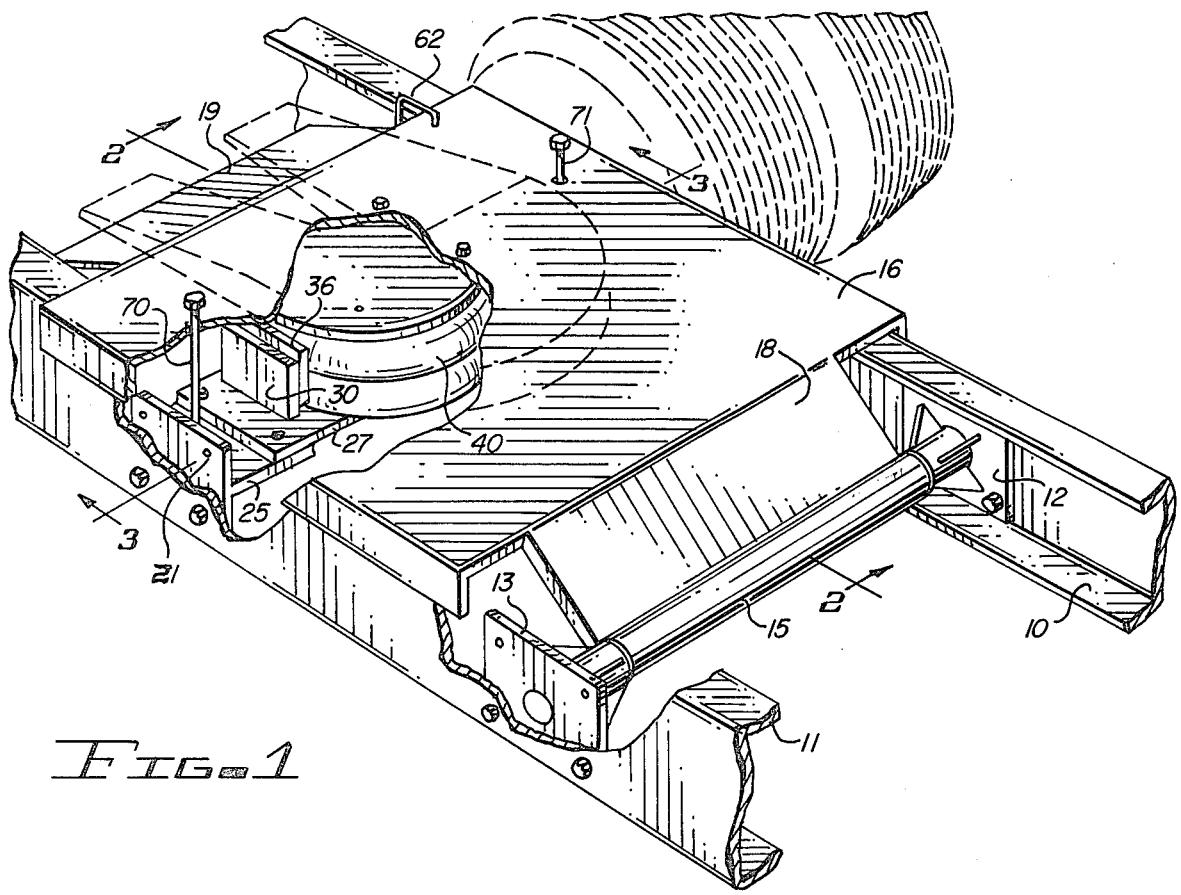
FIG. 1 is a partially cut away perspective view of a preferred embodiment of the invention.

Reference now should be made to the drawing in which the same or similar components are designated by the same reference numbers throughout the different figures. The fifth wheel mounting assembly which is shown in the drawing is constructed to be mounted on a tractor frame behind the rear of the cab of the tractor. Since the structure of the tractor is unimportant to an understanding of the invention, only a portion of the two longitudinal side frame members 10 and 11, to which the conventional fifth wheel assembly is normally attached, have been shown in the drawings.

In place of mounting the fifth wheel assembly directly on top of these frame members, as is common practice, the fifth wheel mounting assembly shown in the three figures of the drawing is used. This assembly is attached to the frame members 10 and 11 by means of a pair of flanges 12 and 13 which are bolted to or welded to the frame members in the position shown most clearly in FIGS. 1 and 2. These flange members in turn have integrally formed sockets extending inwardly in a facing relationship, as shown most clearly in FIG. 1, for supporting a heavy duty steel pivot rod 14 between them. Typically, the rod 14 has a two-inch diameter an it is inserted through a hollow steel cylinder 15 which is free to rotate about the rod 14. An alternative construction is to integrally form the cylinder 15 and the rod 14 for pivoting within the socket extensions of the flange members 12 and 13.

A fifth wheel support plate 16, which may be made of T-1 steel having a thickness of ¾ inches is attached to the cylinder 15 by means of a sloped forward attaching section 18. Attachment of these sections together preferably is accomplished, by welding but the parts may be integrally formed if desired. At the free end of the plate 16 is a downwardly depending section 19 which is used for safety purposes as described more fully subsequently.

The plate 16 is wider then the two sections 18 and 19 since the plate 16 overlies the frame members 10 and 11 of the tractor, while the forward and rearward sloped sections 18 and 19 extend into the space between the tractor frame members 10 and 11. The plate 16 fully overlies the frame 10 and 11 and has downwardly turned flanges or edges on both sides to closely overly the outside edges of the frame members 10 and 11. Consequently, when the plate 16 is permitted to assume its lowermost position, as shown in solid lines in FIG. 2, it rests directly upon the upper edges of the frame members 10 and 11 and the downwardly turned flanges assist in maintaining proper location and alignment of the plate 16 with the tractor frame.

The fifth wheel suspension system shown in the drawings serves the purpose of allowing the fifth wheel hitch between the tractor and the trailer to float independently of the tractor. This is accomplished by mounting a cross frame member directly under the free end of the plate 16 under the point where the fifth wheel assembly normally would be attached to the frame members 10 and 11 of the tractor. Usually this is directly over the axle of a tractor having a single rear axle or is located between the axles of a tractor having dual rear axles. This cross support member is attached to the inside of the frame members 10 and 11 of the tractor by means of a pair of T-shaped flanges 21 and 22 (shown most clearly in FIGS. 1 and 3). The attachment may be by means of bolts, welding and the like. Inwardly extending, horizontally oriented, support flanges 25 and 26 of the flanges 21 and 22 have an additional cross support plate 27 attached to them. The plate 27 has a pair of upwardly extending flat wear plates 30 and 31 welded to it for engaging, in a close sliding relationship, corresponding wear plates 36 and 37 which are welded to the underside of the plate 16 and depend downwardly from it. The orientation of these wear plates relative to one another is shown most clearly in FIG. 3; and as shown most clearly in FIG. 1, the plates extend longitudinally parallel to the frame members 10 and 11 of the tractor.

For floating the fifth wheel support plate 16 relative to the tractor, a pneumatic suspension bag or air bag 40 is attached on its lower side to the cross support plate 27 and on its upper side to the underside of the plate 16. The air suspension bag 40 is of a type similar to those used as the heavy duty air suspension springs or cushioning members for railroad cars and the like. In its uninflated position, the air bag 40 assumes the compressed shape shown in FIG. 2; so that the plate 16 overlies and engages the frame members 10 and 11, as described previously. A standard tractor trailer fifth wheel assembly then is attached to the support plate 16 in the same position relative to the tractor axle that it normally would occupy if it were attached directly to the frame of the tractor. This attachment may be by any suitable means; and since the fifth wheel assembly itself is standard, it has not been shown in the drawing except to indicate the fifth wheel in dotted lines in FIG. 1. When the assembly is in the solid line position shown in FIG. 2, the trailer may be hitched and unhitched from the tractor in a normal manner. Also, it should be noted that the trailer is not elevated to any significant amount above the height it has for conventional tractor trailer fifth wheel structures where the fifth wheel assembly is attached directly to the frame of the tractor. The only difference is the ¾ inch elevation provided by the thickness of the support plate 16, but this is a relatively insignificant height difference. Consequently, if it is necessary for the tractor trailer combination to pass under low overhead structures, the suspension system can be deflated to the position shown in FIG. 2.

Figure 2:
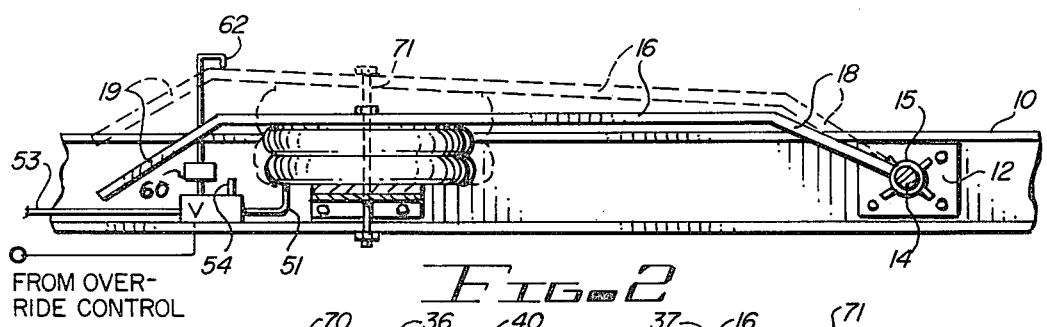
FIG. 2 is a sectional view taken along the line 2—2 of FIG. 1.

Normally, however, the air bag 40 is inflated to a point where the fifth wheel assembly supporting the trailer is elevated 2½ to 3 inches above the tractor frame as indicated in dotted lines in FIG. 2. In this position, the weight of the trailer is carried by the air bag 40 to provide substantial isolation between the trailer and the tractor to enable the tractor and trailer to work relatively independently of one another. Consequently, the shock normally transmitted between the tractor and trailer through the fifth wheel assembly is significantly reduced, prolonging the mechanical life of the equipment and reducing the possibility of damage to freight carried within the trailer.

To control the introduction of air into and the removal of air from the air bag 40, a control valve 50 is interposed between an air inlet line 51 to the air bag 40 and an air supply line 53 connected to a conventional air reservoir (not shown) on the tractor. The valve 50 is illustrated as an electrically controlled valve; and when the system is operated in its normal automatic mode by removing an override control operated by a switch (not shown) in the cab of the tractor, the valve 50 couples the lines 51 and 53 to inflate the airbag 40. The inflation continues until the plate 16 reaches the position shown in solid lines in FIG. 3 and in dotted lines in FIG. 2 to engage a lever 62 extending from a switch 60. When the lever 62 is pushed upwardly by the plate 16, the switch 60 is operated to apply a signal to the valve 50 to shut it off and to terminate further application of air to the airbag 40.

By use of the height sensing arm 62 of the switch 60, accomodation for loads of different weights is made automatically. Obviously the desired height is attained with less pressure in the air bag 40 for a light load than for a heavy load. If the sensing arm 62 and switch 60 were not employed, it would be necessary for the operator to visually control the inflation of the air bag 40. The result would be often to underinflate of overinflate the bag 40. Overinflation could tend to raise the plate 16 too high and produce the possibility of damage to the support plate and the bag 40 as well as other portions of the system.

Figure 3:
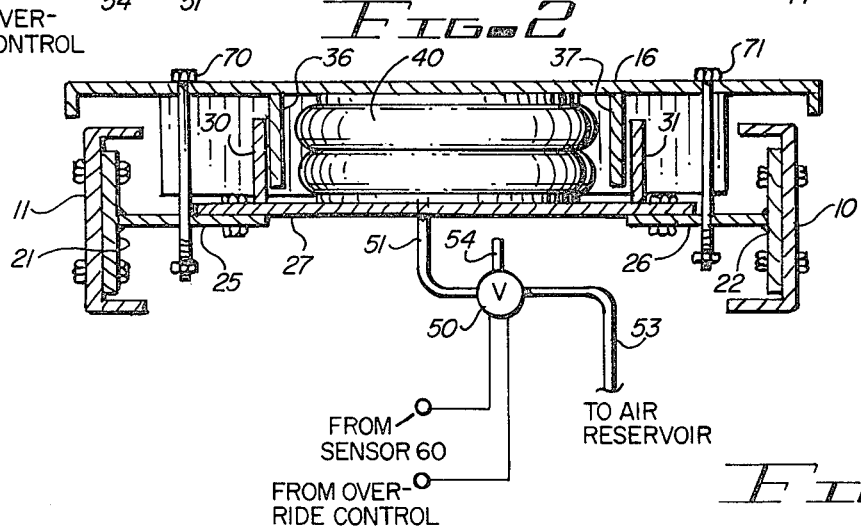
FIG. 3 is a sectional view taken along the line 3—3 of FIG. 1.

When the system is in use and is inflated as shown in FIGS. 2 and 3, the sliding contact of the two pairs of wear plates 30, 36 and 31, 37 provides lateral stability for the fifth wheel mounting plate 16. These plates prevent side to side motion which otherwise would be permitted by the air bag suspension system illustrated in the various figures of the drawing. In addition, the two pairs of wear plates 30, 36 and 31, 37 minimize the tendency for the trailer to cause rolling or tilting of the fifth wheel assembly. To accomplish this desired stability, the two pairs of wear plates preferably are in contact with each other at all times during operation of the fifth wheel suspension system.

When the driver desires to release or unhitch the trailer, or whenever a low overpass is encountered, the override control (not shown) may be operated by the driver to apply a signal to the valve 50 to exhaust the air from the air bag 40 through the line 51 and out of an exhaust port or line 54 extending from the valve 50. This then lowers the plate 16 to rest on top of the upper flanges of the frame members 10 and 11 of the tractor. Hitching and unhitching of a trailer then is effected in a conventional manner.

If the driver forgets to release the air from the air bag 40, and a trailer is unhitched, the tendency of the pressure of air within the air bag 40 when the trailer is removed is to substantially elevate the plate 16 since all of the weight has been removed from the plate. This could result in significant damage to the air bag 40 as well as to other components of the system, such as by breaking off the sensing arm 62 of the switch 60. To prevent this from happening, a pair of safety pin stops 70 and 71 are provided. These simply are in the form of elongated bolts having an enlarged head and freely passing through holes in the plate 16. The bolts also pass freely through holes in the plates 25 and 26; and the limit of the extension permitted is established by adjustment nuts on the lower ends of the bolts 70 and 71. This is shown most clearly in FIG. 3. Thus, if the operator does forget to remove the air from the air bag 40, the upper limit to which the plate 16 is permitted to rise is established by the safety pin stops 70 and 71.

Also, if an attempt is made to hitch a trailer onto the fifth wheel without first removing the air from the air bag 40, the plate 19 is shaped so that even with the assembly in its uppermost position, as determined by the safety pin stops 70 and 71, the pin on the trailer engages the downwardly turned lip 19 to slide the pin upwardly into engagement with the fifth wheel assembly mounted on the plate 16 without damage. The plate 19 serves no other purpose; but for those occasions when an operator forgets to remove the air from the air bags first, it does prevent unnecessary and expensive damage from being imparted to either the fifth wheel mounting assembly or the hitch pin of the trailer.

The fifth wheel mounting assembly which has been described above and which is shown in the three figures of the drawing should be considered illustrative of the invention only and is not to be considered limiting. For example, the hinged end of the assembly could be mounted on top of the frame members 10 and 11. In such a case, the plate 18 would extend upwardly from the upper surface of the support plate 16 to the cylinder 15 instead of the downward extension shown for the illustrated assembly. All other portions of the illustrated assembly would then continue to have the same orientation which is shown in the drawings. Various other modifications and changes will occur to those skilled in the art without departing from the true scope of the invention.

We claim:

1. A fifth wheel mounting system for supporting a fifth wheel on a truck tractor frame having at least first and second spaced apart longitudinally extending parallel side frame members, said mounting system including in combination:

a fifth wheel support plate mounted at one end for pivotal movement about a transverse axis mounted on said truck tractor frame and located beneath the plane of the upper surface of said first and second side frame members, said support plate extending over at least a portion of each of said side frame members;

a suspension means support member mounted between said first and second side frame members of said truck tractor frame and located beneath the plane of the upper surface of said first and second side frame members;

resilient suspension means mounted on said suspension means support member between said suspension means support member and the other end of said support plate for normally elevating said other end of said support plate a predetermined distance above the plane of the upper surface of said side frame members; and means attached to and cooperating with said support plate and said suspension means support member for minimizing lateral shift and roll of said support plate.

2. The combination according to claim 1 wherein the transverse axis about which said support plate is mounted is located near the forward end of said frame and the other end of said support plate on which a fifth wheel is to be mounted is located near the rear end of said frame.

3. The combination according to claim 1 wherein said resilient suspension means is selectively adjustable to lower said support plate to rest on said frame.

4. The combination according to claim 3 wherein said resilient suspension means comprises an air suspension means.

5. The combination according to claim 4 further including control means for controlling the application of air to and the release of air from said air suspension means; and sensing means responsive to movement of said support plate for terminating the introduction of air into said air suspension means when said support plate is elevated to said predetermined distance above said frame.

6. The combination according to claim 1 wherein said means for minimizing lateral shift and roll includes first and second pairs of first and second cooperating wear plates, with the first wear plate of each of said pairs being spaced apart transversely from one another and attached to and depending from said support plate and located in sliding relationship with the second plates, respectively, of each of said pairs of wear plates mounted in fixed position with respect to said suspension means support member.

7. The combination according to claim 6 wherein said wear plates each comprise flat plates, the planes of which are perpendicular to said support plate and the plane of said tractor trailer frame and extend longitudinally of said tractor trailer frame.

8. The combination according to claim 1 wherein the transverse axis about which said support plate is mounted is located near the forward end of said frame and the other end of said support plate on which a fifth wheel is to be mounted is located near the rear end of said frame; and said resilient suspension means is selectively adjustable to lower said support plate to rest on said frame.

9. The combination according to claim 8 wherein said resilient suspension means comprises an air suspension means.

10. The combination according to claim 9 further including valve control means for controlling the application of air to and the release of air from said air suspension means; and sensing means responsive to movement of said support plate for terminating the introduction of air into said air suspension means when said support plate is elevated to said predetermined distance above said frame.

11. A fifth wheel mounting system for supporting a fifth wheel on a truck tractor frame comprising at least first and second spaced apart longitudinally extending parallel frame members, said system including in combination:

a fifth wheel support plate mounted at one end for pivotal movement about a transverse axis extending across said first and second frame members;

a suspension means support member mounted between the first and second parallel frame members and located beneath the plane of the upper surface thereof;

resilient suspension means supported on said suspension means support member beneath the other end of said support plate for normally elevating said other end of said support plate a predetermined distance above said truck tractor frame; and first and second pairs of first and second cooperating wear plates, respectively, for minimizing lateral shift and roll of said support plate, each of said wear plates comprising flat plates the planes of which are perpendicular to said support plate and the plane of said tractor frame and extend longitudinally of said tractor frame, the first wear plates of each of said pairs being spaced apart transversely from one another and attached to and depending from said support plate and located in sliding relationship with the second plates, respectively, of each of said pairs of wear plates mounted in fixed position with respect to said frame.

12. The combination according to claim 11 wherein the transverse axis about which said support plate is mounted is located near the forward end of said frame and the other end of said support plate on which a fifth wheel is to be mounted is located near the end of said frame.

13. The combination according to claim 12 wherein said resilient suspension means is selectively adjustable to lower said support plate to rest on said frame.

14. The combination according to claim 13 wherein said resilient suspension means comprises an air suspension means.

15. The combination according to claim 14 further including control means for controlling the application of air to and the release of air from said air suspension means; and sensing means for terminating the introduction of air into said air suspension means when said support plate is elevated to said predetermined distance above said frame.

* * * * *